United States Patent
Gouda et al.

(10) Patent No.: US 10,611,940 B2
(45) Date of Patent: Apr. 7, 2020

(54) ANTI-FOGGING AGENT COMPRISING A FLUOROSURFACTANT MIXTURE

(71) Applicant: Kobayashi Pharmaceutical Co., Ltd., Osaka-shi, Osaka (JP)

(72) Inventors: Takahisa Gouda, Osaka (JP); Yoshinao Iwasawa, Osaka (JP)

(73) Assignee: KOBAYASHI PHARMACEUTICAL CO., LTD., Osaka (JP)

( * ) Notice: Subject to any disclaimer, the term of this patent is extended or adjusted under 35 U.S.C. 154(b) by 0 days.

(21) Appl. No.: 15/511,552

(22) PCT Filed: Sep. 17, 2015

(86) PCT No.: PCT/JP2015/076544
§ 371 (c)(1),
(2) Date: Mar. 15, 2017

(87) PCT Pub. No.: WO2016/043283
PCT Pub. Date: Mar. 24, 2016

(65) Prior Publication Data
US 2017/0240786 A1    Aug. 24, 2017

(30) Foreign Application Priority Data

Sep. 19, 2014    (JP) .................................. 2014-191804

(51) Int. Cl.
| | | |
|---|---|---|
| C11D 1/88 | (2006.01) | |
| C09K 3/18 | (2006.01) | |
| C11D 1/94 | (2006.01) | |
| B08B 1/00 | (2006.01) | |
| B08B 3/08 | (2006.01) | |
| B08B 17/00 | (2006.01) | |
| C11D 1/00 | (2006.01) | |
| C11D 3/00 | (2006.01) | |
| C11D 11/00 | (2006.01) | |
| C11D 17/04 | (2006.01) | |
| G02C 13/00 | (2006.01) | |

(52) U.S. Cl.
CPC ................ *C09K 3/18* (2013.01); *B08B 1/006* (2013.01); *B08B 3/08* (2013.01); *B08B 17/00* (2013.01); *C11D 1/004* (2013.01); *C11D 1/88* (2013.01); *C11D 1/94* (2013.01); *C11D 3/0078* (2013.01); *C11D 11/0035* (2013.01); *C11D 17/049* (2013.01); *G02C 13/006* (2013.01)

(58) Field of Classification Search
CPC .... C11D 1/88; C11D 1/75; C11D 1/90; C11D 3/201; C11D 11/0023; C11D 1/004
See application file for complete search history.

(56) References Cited

U.S. PATENT DOCUMENTS

| | | | |
|---|---|---|---|
| 2006/0009369 A1* | 1/2006 | Kilkenny | A01N 33/12 510/504 |
| 2006/0287217 A1* | 12/2006 | Keilman | C11D 3/201 510/499 |
| 2008/0312119 A1 | 12/2008 | Jaynes et al. | |
| 2009/0143273 A1* | 6/2009 | Cheung | C11D 1/645 510/391 |

FOREIGN PATENT DOCUMENTS

| | | |
|---|---|---|
| CA | 1323819 | 11/1993 |
| JP | 56-072071 | 6/1981 |
| JP | 6-158033 | 6/1994 |
| JP | 7-020411 | 1/1995 |
| JP | 2009-195648 | 9/2009 |
| JP | 2013-195803 | 9/2013 |
| JP | 2013-216778 | 10/2013 |
| WO | 00/35571 | * 6/2000 |
| WO | 2005/030917 | 4/2005 |

* cited by examiner

*Primary Examiner* — Charles I Boyer
(74) *Attorney, Agent, or Firm* — Hamre, Schumann, Mueller & Larson, P.C.

(57) ABSTRACT

The present invention provides anti-fogging agents and cleaners that provide long-lasting prevention of fogging of glass, plastic, or other hard surfaces. The present invention relates to an anti-fogging agent or cleaner which contains: (A) a fluorinated amphoteric surfactant; (B) a fluorinated anionic or cationic surfactant; and (C) a non-fluorinated amphoteric surfactant. The present invention also relates to an eyeglass cleaner including a non-woven fabric impregnated with the anti-fogging agent or cleaner.

12 Claims, No Drawings

ANTI-FOGGING AGENT COMPRISING A FLUOROSURFACTANT MIXTURE

TECHNICAL FIELD

The present invention relates to anti-fogging agents for glass, plastic, or other hard surfaces.

BACKGROUND ART

Known methods for removing dirt and grime from eyeglass lenses, sunglass lenses, cellphone screens, watch crystals, TV or PC glass screens, mirrors, or other products include cleaning with a microfiber woven fabric, ultrasonic cleaning, or a cleaner containing a surfactant. Among these methods, cleaning with a cleaner containing a surfactant is simple and can be adapted to provide additional functions such as preventing readhesion of dirt and grime or preventing fogging on hard surfaces.

As an example of such cleaning with a cleaner containing a surfactant, Patent Literature 1 discloses a cleaner containing a fluorinated surfactant and a non-fluorinated surfactant. The cleaner, however, incorporates a comparatively large amount of the fluorinated surfactant in order to prevent readhesion of dirt and grime, and is not described as an anti-fogging agent. Indeed, the cleaner has an insufficient anti-fogging effect.

Patent Literature 2 discloses an anti-fogging cloth impregnated with a liquid containing a fluorinated cationic surfactant and a fluorinated nonionic surfactant. The anti-fogging cloth, however, is required to have a comparatively high fluorinated surfactant content, and cannot show a sufficiently long-lasting anti-fogging effect.

CITATION LIST

Patent Literature

Patent Literature 1: JP 2013-216778 A
Patent Literature 2: JP 2009-195648 A

SUMMARY OF INVENTION

Technical Problem

The present invention aims to provide anti-fogging agents and cleaners that provide long-lasting prevention of fogging of glass, plastic, or other hard surfaces.

Solution to Problem

The inventors have made extensive studies to achieve the above aim, and have found that the combined use of specific two types of fluorinated surfactants and a non-fluorinated amphoteric surfactant provides improved coating uniformity and a long-lasting anti-fogging effect even when the fluorinated surfactant content is greatly reduced. Accordingly, the inventors have completed the present invention.

Specifically, one aspect of the present invention relates to an anti-fogging agent, containing: (A) a fluorinated amphoteric surfactant; (B) a fluorinated anionic or cationic surfactant; and (C) a non-fluorinated amphoteric surfactant.

The fluorinated amphoteric surfactant (A) is preferably present at a concentration of 0.1 to 20 wt %.

The fluorinated anionic or cationic surfactant (B) is preferably present at a concentration of 0.01 to 20 wt %.

The fluorinated amphoteric surfactant (A) preferably contains a perfluoroalkyl or perfluoroalkenyl group.

Another aspect of the present invention relates to a cleaner, containing: (A) a fluorinated amphoteric surfactant; (B) a fluorinated anionic or cationic surfactant; and (C) a non-fluorinated amphoteric surfactant.

Yet another aspect of the present invention relates to an eyeglass cleaner, including a non-woven fabric impregnated with the anti-fogging agent or cleaner.

Advantageous Effects of Invention

The anti-fogging agent or cleaner of the present invention containing (A) a fluorinated amphoteric surfactant, (B) a fluorinated anionic or cationic surfactant, and (C) a non-fluorinated amphoteric surfactant can exhibit improved coating uniformity and a long-lasting anti-fogging effect even when the fluorinated surfactant content is greatly reduced.

DESCRIPTION OF EMBODIMENTS

The anti-fogging agent or cleaner of the present invention contains (A) a fluorinated amphoteric surfactant, (B) a fluorinated anionic or cationic surfactant, and (C) a non-fluorinated amphoteric surfactant.

The fluorinated amphoteric surfactant (A) refers to an amphoteric surfactant in which a hydrogen atom in an alkyl chain of the surfactant is replaced with a fluorine atom. For example, it may be a compound represented by the following formula (1):

$$R^f\text{—}X\text{—}Y^a \qquad (1)$$

wherein $R^f$ represents a fluoroalkyl or fluoroalkenyl group; X represents an alkylene or arylene group which may contain a sulfoamide, carbonyl, or oxa group; and $Y^a$ represents a zwitterionic group.

The number of carbon atoms in the fluoroalkyl or fluoroalkenyl group designated by $R^f$ is preferably, but not limited to, 3 to 20. The fluoroalkyl or fluoroalkenyl group may have a linear, branched, or cyclic structure, but preferably has a linear structure for easy availability. Also, the number of substituted fluorine atoms in the fluoroalkyl or fluoroalkenyl group is not particularly limited. Still, the fluoroalkyl or fluoroalkenyl group is preferably one in which all the hydrogen atoms have been replaced with fluorine atoms, i.e. a perfluoroalkyl or perfluoroalkenyl group.

Examples of the zwitterionic group designated by $Y^a$ include, but are not limited to, betaine, sulfobetaine, and amine oxide groups.

The concentration of the fluorinated amphoteric surfactant (A) in the composition is preferably, but not limited to, 30 wt % or less, more preferably 0.1 to 20 wt %, still more preferably 0.8 to 10 wt %. The composition containing less than 0.1 wt % fluorinated amphoteric surfactant (A) may not exhibit a sufficient anti-fogging effect, while the composition containing more than 30 wt % fluorinated amphoteric surfactant (A) may exhibit deteriorated temporal stability and is not preferred from the cost standpoint.

The fluorinated anionic surfactant (B) refers to an anionic surfactant in which a hydrogen atom in an alkyl chain of the surfactant is replaced with a fluorine atom. For example, it may be a compound represented by the following formula (2):

$$R^f\text{—}X\text{—}Y^b \qquad (2)$$

wherein $R^f$ and X are as described in formula (1), and $Y^b$ represents an anionic group.

Examples of the anionic group designated by $Y^b$ include, but are not limited to, carboxyl, sulfuric acid, sulfone, and phosphoric acid groups.

The concentration of the fluorinated anionic surfactant (B) in the composition is preferably, but not limited to, 30 wt % or less, more preferably 0.01 to 20 wt %, still more preferably 0.1 to 10 wt %. The composition containing less than 0.01 wt % fluorinated anionic surfactant (B) may not exhibit a sufficient anti-fogging effect, while the composition containing more than 30 wt % fluorinated anionic surfactant (B) may exhibit deteriorated temporal stability and is not preferred from the cost standpoint.

The fluorinated cationic surfactant (B) refers to a cationic surfactant in which a hydrogen atom in an alkyl chain of the surfactant is replaced with a fluorine atom. For example, it may be a compound represented by the following formula (3):

$$R^f-X-Y^c \qquad (3)$$

wherein $R^f$ and X are as described in formula (1), and $Y^c$ represents a cationic group.

Examples of the cationic group designated by $Y^c$ include, but are not limited to, quaternary ammonium groups.

The concentration of the fluorinated cationic surfactant (B) in the composition is preferably, but not limited to, 30 wt % or less, more preferably 0.01 to 20 wt %, still more preferably 0.03 to 10 wt %. The composition containing less than 0.01 wt % fluorinated cationic surfactant (B) may not exhibit a sufficient anti-fogging effect, while the composition containing more than 30 wt % fluorinated cationic surfactant (B) may exhibit deteriorated temporal stability and is not preferred from the cost standpoint.

The non-fluorinated amphoteric surfactant (C) refers to an amphoteric surfactant containing no fluorine atom in its alkyl chain. Examples include cocamidopropyl betaine, lauryl betaine, lauramidopropyl betaine, alkyldimethylaminoacetic acid betaine, 2-alkyl-N-carboxymethyl-N-hydroxyethyl imidazolinium betaine, lauryl hydroxysultaine, lauryl (2-hydroxy-3-sulfopropyl)dimethyl betaine, sodium β-laurylaminopropionate, sodium lauryldiaminoethylglycine, decyldimethylamine oxide, and lauryldimethylamine oxide.

The concentration of the non-fluorinated amphoteric surfactant (C) in the composition is preferably, but not limited to, 30 wt % or less, more preferably 0.1 to 20 wt %, still more preferably 0.6 to 10 wt %. The composition containing less than 0.1 wt % non-fluorinated amphoteric surfactant (C) may exhibit poor coating uniformity, while the composition containing more than 30 wt % non-fluorinated amphoteric surfactant (C) may exhibit deteriorated temporal stability and is not preferred from the cost standpoint.

The combined concentration of the fluorinated amphoteric surfactant (A) and the fluorinated anionic or cationic surfactant (B) in the composition is preferably, but not limited to, 60 wt % or less, more preferably 0.1 to 40 wt %, still more preferably 0.9 to 20 wt %. The composition containing less than 0.1 wt % surfactants (A) and (B) may not exhibit a sufficient anti-fogging effect, while the composition containing more than 60 wt % surfactants (A) and (B) may exhibit deteriorated temporal stability and is not preferred from the cost standpoint. As to the upper limit of the combined concentration, even the composition containing 2 wt % or less surfactants (A) and (B) can produce the effect.

The solvent used may be water or an alcohol, for example. Examples of the alcohol include methanol, ethanol, propanol, isopropanol, butanol, and t-butanol. The water and alcohol may be used alone, but are preferably used in admixture to provide both quick-drying properties and detergency on grease and other dirt and grime.

The concentration of water in the composition is preferably, but not limited to, 99 wt % or less, more preferably 10 to 90 wt %, still more preferably 20 to 80 wt %. The concentration of alcohol in the composition is preferably, but not limited to, 99 wt %, more preferably 10 to 90 wt %, still more preferably 20 to 80 wt %.

The anti-fogging agent or cleaner of the present invention may contain, for example, a solvent, chelating agent, builder, preservative, colorant, fragrance, stabilizer, UV blocking agent, alkalizing agent, thickener, hydrotropic agent, enzyme, and antibacterial agent, as long as the effect of the present invention is not impaired.

The anti-fogging agent or cleaner of the present invention is intended to be applied to a hard surface. Examples of the hard surface include, but are not limited to, eyeglass lenses, sunglass lenses, cellphone screens, watch crystals, TV or PC glass screens, and mirrors. The anti-fogging agent or cleaner of the present invention can be uniformly applied even to a coated hard surface to which surfactants are difficult to apply uniformly, and can exhibit a long-lasting anti-fogging effect.

The anti-fogging agent or cleaner of the present invention may be applied by, for example, a method in which a non-woven fabric is impregnated with the anti-fogging agent or cleaning composition of the present invention, a method in which a container equipped with a nozzle, a spray container, a pen-type container equipped with a liquid absorbing wick, or other similar containers is filled with the anti-fogging agent or cleaner, or a method in which the anti-fogging agent or cleaner is applied and spread with a brush. In such cases, the anti-fogging agent or cleaner applied to a hard surface may be spread over the surface using an additional material such as a dry non-woven fabric. Among the above methods, the non-woven fabric impregnation method is preferred from standpoints such as portability, ease of wiping, and scraping of dirt and grime.

The material of the non-woven fabric used in the non-woven fabric impregnation method may be, for example, but not limited to, rayon, acrylic material, cotton, polyethylene terephthalate, polybutylene terephthalate, polyethylene, polypropylene, or nylon. Also, the non-woven fabric may be produced by any method, and examples include binder-bonded fabrics, spunbonded fabrics, needle-punched fabrics, spunlace fabrics, spray fiber fabrics, and stitch-bonded fabrics. The substrate impregnated with the anti-fogging or cleaner is not limited to non-woven fabrics and may be, for example, a woven fabric or paper, which may be made from any material.

EXAMPLES

Hereinafter, the present invention is described in detail with reference to examples. The present invention, however, is not limited to the examples.

The chemicals used in the examples and comparative examples are listed below.

Fluorinated amphoteric surfactant: a perfluoroalkyl compound, "SURFLON S-233" from AGC Seimi Chemical Co., Ltd., concentration=30 wt %

Fluorinated anionic surfactant: a perfluoroalkyl compound, "SURFLON S-211" from AGC Seimi Chemical Co., Ltd., concentration=50 wt %

Fluorinated cationic surfactant 1: a perfluoroalkyl compound, "SURFLON S-221" from AGC Seimi Chemical Co., Ltd., concentration=30 wt %

Fluorinated cationic surfactant 2: a quaternary ammonium salt (iodine salt) of a fluorine compound, "Ftergent 310" from NEOS Company Limited., concentration=100 wt %

Amphoteric surfactant 1: lauryl(2-hydroxy-3-sulfopropyl) dimethyl betaine, "AMPHITOL 20HD" from Kao Corporation, concentration=30 wt %

Amphoteric surfactant 2: lauryldimethylamine oxide, "AMOGEN AOL" from DKS Co. Ltd., concentration=32 wt %

Amphoteric surfactant 3: alkyldimethylaminoacetic acid betaine, "AMOGEN SH" from DKS Co. Ltd., concentration=29 wt %

Fluorinated nonionic surfactant: a perfluoroalkyl compound, "SURFLON S-242" from AGC Seimi Chemical Co., Ltd., concentration=100 wt % Anionic surfactant: disodium polyoxyethylene alkyl (C12-14) sulfosuccinate, "NEO-HITENOL S70" from DKS Co. Ltd., concentration=25 wt %

Isopropyl alcohol: "TOKUSO IPA" from Tokuyama Corporation

Examples 1 to 14 and Comparative Examples 1 to 11

The surfactants, isopropyl alcohol, and water as shown in Table 1 to 3 were mixed in the amounts indicated in the table to prepare anti-fogging agents.

<Anti-fogging test>

Before the test, a 140 ml mayonnaise jar was charged with water (100 g) and placed in a water bath controlled to maintain 50° C. to 57° C., so that the water in the mayonnaise jar was kept at 50° C. to 57° C. A wiper (11 cm×11 cm, "KAYDRY wiper" from Nippon Paper Crecia Co., Ltd.) was folded in four. The center portion of the folded wiper was impregnated with the prepared anti-fogging agent (50 µl). The anti-fogging agent was applied to the convex surface of a lens (Super Power Shield Coat, refractive index=1.76, "BELNA ZX-AS" from Tokai Optical Co., Ltd.) by gently spreading the agent across the surface with the wiper twice in a constant direction. The lens was then rotated by 90°, and the anti-fogging agent was gently applied to the lens twice in a constant direction in the same manner as described above. Here, coating uniformity was evaluated based on the criteria below. The lens to which the anti-fogging agent was applied was well dried, and mounted on the opening of the mayonnaise jar with its convex surface facing down. At that time, the anti-fogging test was started. The lens was visually observed, and the time (anti-fogging duration) was measured until about half the area of the lens located inwardly of the portion in contact with the opening of the mayonnaise jar was fogged. Also, the anti-fogging effect was evaluated based on the criteria below. The results are shown in Tables 1 to 3.

(Coating uniformity)
Excellent: easy to apply and spread so that it can be uniformly and evenly spread
Good: easy to apply and spread so that it can be substantially uniformly spread with slight unevenness
Fair: difficult to apply and spread, causing slight unevenness
Poor: difficult to apply and spread, causing unevenness (Anti-fogging effect)
Excellent: 20 minutes or more
Good: at least 5 minutes but less than 20 minutes
Fair: more than 0 minutes but less than 5 minutes
Poor: immediately fogged (indicated as 0 minutes in the tables)

TABLE 1

| | | Example | | Comparative Example | | | | |
|---|---|---|---|---|---|---|---|---|
| | Example Nos. | 1 | 2 | 1 | 2 | 3 | 4 | 5 |
| Component (wt %) | SURFLON S-233 (Fluorinated amphoteric surfactant (A)) | 2.7 (0.8) | 2.7 (0.8) | 6.7 (2.0) | | | | |
| | SURFLON S-211 (Fluorinated anionic surfactant (B)) | 0.1 (0.05) | | | 4.0 (2.0) | | | |
| | SURFLON S-221 (Fluorinated cationic surfactant 1 (B)) | | 0.1 (0.03) | | | 6.7 (2.0) | | |
| | SURFLON S-242 (Fluorinated nonionic surfactant) | | | | | | 2.0 (2.0) | |
| | AMPHITOL 20HD (Amphoteric surfactant 1 (C)) | 2.0 (0.6) | 2.0 (0.6) | | | | | 6.7 (2.0) |
| | NEO-HITENOL S70 (Anionic surfactant) | | | | | | | |
| | Total surfactant concentration (wt %) | 1.45 | 1.43 | 2.0 | 2.0 | 2.0 | 2.0 | 2.0 |
| | Isopropyl alcohol | 30 | 30 | 30 | 30 | 30 | 30 | 30 |
| | Water | 65.2 | 65.2 | 63.3 | 66.0 | 63.3 | 68.0 | 63.3 |
| Evaluation result | Coating uniformity | Excellent | Excellent | Fair | Good | Fair | Poor | Poor |
| | Anti-fogging duration (min) | 21 | 18 | 15 | 11 | 0 | 0 | 0 |
| | Anti-fogging effect | Excellent | Good | Good | Good | Poor | Poor | Poor |

TABLE 1-continued

|  |  | Comparative Example | | | | | |
|---|---|---|---|---|---|---|---|
| Example Nos. |  | 6 | 7 | 8 | 9 | 10 | 11 |
| Component (wt %) | SURFLON S-233 (Fluorinated amphoteric surfactant (A)) | 3.3 (1.0) | 3.3 (1.0) | 3.3 (1.0) |  |  | 3.3 (1.0) |
|  | SURFLON S-211 (Fluorinated anionic surfactant (B)) | 2.0 (1.0) |  |  | 2.0 (1.0) |  | 4.0 (2.0) |
|  | SURFLON S-221 (Fluorinated cationic surfactant 1 (B)) |  | 3.3 (1.0) |  |  | 3.3 (1.0) |  |
|  | SURFLON S-242 (Fluorinated nonionic surfactant) |  |  |  |  |  |  |
|  | AMPHITOL 20HD (Amphoteric surfactant 1 (C)) |  |  | 3.3 (1.0) | 3.3 (1.0) | 3.3 (1.0) |  |
|  | NEO-HITENOL S70 (Anionic surfactant) |  |  |  |  |  | 4.0 (1.0) |
|  | Total surfactant concentration (wt %) | 2.0 | 2.0 | 2.0 | 2.0 | 2.0 | 4.0 |
|  | Isopropyl alcohol | 30 | 30 | 30 | 30 | 30 | 30 |
|  | Water | 64.7 | 63.4 | 63.4 | 64.7 | 63.4 | 58.7 |
| Evaluation result | Coating uniformity | Poor | Fair | Good | Good | Poor | Good |
|  | Anti-fogging duration (min) | 9 | 9 | 14 | 9 | 0 | 14 |
|  | Anti-fogging effect | Good | Good | Good | Good | Poor | Good |

Table 1 shows that in Comparative Examples 1 to 5 in which a surfactant was used alone, both the anti-fogging effect and the coating uniformity were not satisfactory. Also in Comparative Examples 6 to 10 in which two types of surfactants, including at least one fluorinated surfactant, were used in combination, both the anti-fogging effect and the coating uniformity were not satisfactory, either. In Comparative Example 11 in which two types of fluorinated surfactants and a non-fluorinated anionic surfactant were used in combination, the coating uniformity and the anti-fogging effect were improved to some extent, but were still not satisfactory. In contrast, when three types of surfactants, including a fluorinated amphoteric surfactant (A), a fluorinated anionic or cationic surfactant (B), and a non-fluorinated amphoteric surfactant (C), were combined, excellent coating uniformity (indicated as Excellent) and a long-lasting high anti-fogging effect were obtained as shown in Examples 1 and 2.

TABLE 2

|  |  | Example | | | | | | |
|---|---|---|---|---|---|---|---|---|
| Example Nos. |  | 1 | 3 | 4 | 5 | 6 | 7 | 8 |
| Component (wt %) | SURFLON S-233 (Fluorinated amphoteric surfactant (A)) | 2.7 (0.8) | 3.3 (1.0) | 6.7 (2.0) | 33.3 (10.0) | 3.3 (1.0) | 3.3 (1.0) | 3.3 (1.0) |
|  | SURFLON S-211 (Fluorinated anionic surfactant (B)) | 0.1 (0.05) | 0.2 (0.1) | 0.2 (0.1) | 0.2 (0.1) | 0.2 (0.1) | 4.0 (2.0) | 20.0 (10.0) |
|  | AMPHITOL 20HD (Amphoteric surfactant 1 (C)) | 2.0 (0.6) | 6.7 (2.0) | 3.3 (1.0) | 3.3 (1.0) |  | 3.3 (1.0) | 3.3 (1.0) |
|  | AMOGEN AOL (Amphoteric surfactant 2 (C)) |  |  |  |  | 3.4 (1.1) |  |  |
|  | Total surfactant concentration (wt %) | 1.45 | 3.1 | 3.1 | 11.1 | 2.2 | 4.0 | 12.0 |
|  | Isopropyl alcohol | 30 | 30 | 30 | 30 | 30 | 30 | 30 |
|  | Water | 65.2 | 59.8 | 59.8 | 33.2 | 63.1 | 59.4 | 43.4 |
| Evaluation result | Coating uniformity | Excellent | Excellent | Excellent | Excellent | Excellent | Excellent | Excellent |
|  | Anti-fogging duration (min) | 21 | 20 | 20 | >60 | 17 | 30 | 40 |
|  | Anti-fogging effect | Excellent | Excellent | Excellent | Excellent | Good | Excellent | Excellent |

Table 2 shows the results of experiments with different concentrations of particularly the fluorinated anionic surfactant (B). As shown in Table 2, excellent coating uniformity was maintained even in Example 1 in which the concentration of the fluorinated anionic surfactant (B) was 0.05 wt % which was 200 times lower than the highest concentration (10.0 wt %) used in Example 8. This proves that a long-lasting anti-fogging effect can be achieved while maintaining coating uniformity, even when the fluorinated anionic surfactant (B) content is greatly reduced.

TABLE 3

| | | Example | | | | | | |
|---|---|---|---|---|---|---|---|---|
| | Example Nos. | 2 | 9 | 10 | 11 | 12 | 13 | 14 |
| Component (wt %) | SURFLON S-233 (Fluorinated amphoteric surfactant (A)) | 2.7 (0.8) | 3.3 (1.0) | 6.7 (2.0) | 33.3 (10.0) | 3.3 (1.0) | 6.7 (2.0) | 3.3 (1.0) |
| | SURFLON S-221 (Fluorinated cationic surfactant 1 (B)) | 0.1 (0.03) | 0.3 (0.1) | 0.3 (0.1) | 0.3 (0.1) | 0.3 (0.1) | | 3.3 (1.0) |
| | Ftergent 310 (Fluorinated cationic surfactant 2 (B)) | | | | | | 0.1 (0.1) | |
| | AMPHITOL 20HD (Amphoteric surfactant 1 (C)) | 2.0 (0.6) | 6.7 (2.0) | 3.3 (1.0) | 3.3 (1.0) | | 3.3 (1.0) | 3.3 (1.0) |
| | AMOGEN SH (Amphoteric surfactant 3 (C)) | | | | | 3.3 (1.0) | | |
| | Total surfactant concentration (wt %) | 1.43 | 3.1 | 3.1 | 11.1 | 2.1 | 3.1 | 3.0 |
| | Isopropyl alcohol | 30 | 30 | 30 | 30 | 30 | 30 | 30 |
| | Water | 65.2 | 59.7 | 59.7 | 33.1 | 63.1 | 59.9 | 60.1 |
| Evaluation result | Coating uniformity | Excellent | Excellent | Excellent | Excellent | Excellent | Excellent | Excellent |
| | Anti-fogging duration (min) | 18 | 19 | 22 | >60 | 19 | 27 | 15 |
| | Anti-fogging effect | Good | Good | Excellent | Excellent | Good | Excellent | Good |

Table 3 shows the results of experiments with different concentrations of particularly the fluorinated cationic surfactant (B). As shown in Table 3, excellent coating uniformity was maintained even in Example 2 in which the concentration of the fluorinated cationic surfactant (B) was 0.03 wt % which was 33 times lower than the highest concentration (1.0 wt %) used in Example 14. This proves that a long-lasting anti-fogging effect can be achieved while maintaining coating uniformity, even when the fluorinated cationic surfactant (B) content is greatly reduced.

The invention claimed is:

1. An anti-fogging agent, comprising:
(A) a fluorinated amphoteric surfactant represented by the following formula (1):

$$R^f\text{—}X\text{—}Y^a \quad (1),$$

wherein $R^f$ represents a fluoroalkyl or fluoroalkenyl group,
X represents an alkylene or arylene group which may contain a sulfoamide, carbonyl, or oxa group, and
$Y^a$ represents a zwitterionic group selected from the group consisting of betaine, sulfobetaine, and amine oxide groups;

(B) a fluorinated anionic or cationic surfactant,
wherein the fluorinated anionic surfactant is represented by the following formula (2):

$$R^f\text{—}X\text{—}Y^b \quad (2),$$

wherein $R^f$ and X are as described in formula (1) and
$Y^b$ represents an anionic group selected from the group consisting of carboxyl, sulfuric acid, sulfone, and phosphoric acid groups and wherein the fluorinated cationic surfactant is represented by the following formula (3):

$$R^f\text{—}X\text{—}Y^c \quad (3),$$

wherein $R^f$ and X are as described in formula (1) and
$Y^c$ represents an ammonium group;

(C) a non-fluorinated amphoteric surfactant selected from the group consisting of cocamidopropyl betaine, lauryl betaine, lauramidopropyl betaine, alkyldimethylaminoacetic acid betaine, 2-alkyl-N-carboxymethyl-N-hydroxyethyl imidazolinium betaine, lauryl hydroxysultaine, lauryl(2-hydroxy-3-sulfopropyl)dimethyl betaine, sodium β-laurylaminopropionate, sodium lauryldiaminoethylglycine, decyldimethylamine oxide, and lauryldimethylamine oxide; and an alcohol,
wherein concentration of the alcohol is 10 to 90 wt %, and
wherein the combined concentration of the fluorinated amphoteric (A) and the fluorinated anionic or cationic surfactant (B) is 0.1 to 60 wt %.

2. The anti-fogging agent according to claim 1, wherein the fluorinated amphoteric surfactant (A) is present at a concentration of 0.1 to 20 wt %.

3. The anti-fogging agent according to claim 1, wherein the fluorinated anionic or cationic surfactant (B) is present at a concentration of 0.01 to 20 wt %.

4. The anti-fogging agent according to claim 1, wherein the fluorinated amphoteric surfactant (A) contains a perfluoroalkyl or perfluoroalkenyl group.

5. A cleaner, comprising:
(A) a fluorinated amphoteric surfactant represented by the following formula (1):

$$R^f\text{—}X\text{—}Y^a \quad (1),$$

wherein $R^f$ represents a fluoroalkyl or fluoroalkenyl group,
X represents an alkylene or arylene group which may contain a sulfoamide, carbonyl, or oxa group, and
$Y^a$ represents a zwitterionic group selected from the group consisting of betaine, sulfobetaine, and amine oxide groups;

(B) a fluorinated anionic or cationic surfactant,
wherein the fluorinated anionic surfactant is represented by the following formula (2):

$$R^f\text{—}X\text{—}Y^b \qquad (2),$$

wherein $R^f$ and X are as described in formula (1) and $Y^b$ represents an anionic group selected from the group consisting of carboxyl, sulfuric acid, sulfone, and phosphoric acid groups and wherein the fluorinated cationic surfactant is represented by the following formula (3):

$$R^f\text{—}X\text{—}Y^c \qquad (3),$$

wherein $R^f$ and X are as described in formula (1) and $Y^c$ represents an ammonium group;

(C) a non-fluorinated amphoteric surfactant selected from the group consisting of cocamidopropyl betaine, lauryl betaine, lauramidopropyl betaine, alkyldimethylaminoacetic acid betaine, 2-alkyl-N-carboxymethyl-N-hydroxyethyl imidazolinium betaine, lauryl hydroxysultaine, lauryl(2-hydroxy-3-sulfopropyl)dimethyl betaine, sodium β-laurylaminopropionate, sodium lauryldiaminoethylglycine, decyldimethylamine oxide, and lauryldimethylamine oxide;

an alcohol,
wherein concentration of the alcohol is 10 to 90 wt %, and
wherein the combined concentration of the fluorinated amphoteric (A) and the fluorinated anionic or cationic surfactant (B) is 0.1 to 60 wt %.

6. An eyeglass cleaner, comprising
a non-woven fabric impregnated with the anti-fogging agent according to claim 1.

7. An eyeglass cleaner, comprising
a non-woven fabric impregnated with the cleaner according to claim 5.

8. The anti-fogging agent according to claim 1, wherein the alcohol is selected from the group consisting of methanol, ethanol, propanol, isopropanol, butanol, and t-butanol.

9. The cleaner according to claim 5, wherein the alcohol is selected from the group consisting of methanol, ethanol, propanol, isopropanol, butanol, and t-butanol.

10. A cleaning method, comprising:
applying a cleaning agent to a surface in need thereof, the cleaning agent comprising:
(A) a fluorinated amphoteric surfactant;
(B) a fluorinated anionic or cationic surfactant;
(C) a non-fluorinated amphoteric surfactant, and
an alcohol,
wherein the fluorinated amphoteric surfactant (A) is represented by the following formula (1):

$$R^f\text{—}X\text{—}Y^a \qquad (1),$$

wherein $R^f$ represents a fluoroalkyl or fluoroalkenyl group,
X represents an alkylene or arylene group which may contain a sulfoamide, carbonyl, or oxa group, and
$Y^a$ represents a zwitterionic group selected from the group consisting of betaine, sulfobetaine, and amine oxide groups;
wherein the fluorinated anionic surfactant (B) is represented by the following formula (2):

$$R^f\text{—}X\text{—}Y^b \qquad (2),$$

wherein $R^f$ and X are as described in formula (1) and $Y^b$ represents an anionic group selected from the group consisting of carboxyl, sulfuric acid, sulfone, and phosphoric acid groups, wherein the fluorinated cationic surfactant (B) is represented by the following formula (3):

$$R^f\text{—}X\text{—}Y^c \qquad (3),$$

wherein $R^f$ and X are as described in formula (1) and $Y^c$ represents an ammonium group, wherein the non-fluorinated amphoteric surfactant (C) is selected from the group consisting of cocamidopropyl betaine, lauryl betaine, lauramidopropyl betaine, alkyldimethylaminoacetic acid betaine, 2-alkyl-N-carboxymethyl-N-hydroxyethyl imidazolinium betaine, lauryl hydroxysultaine, lauryl(2-hydroxy-3-sulfopropyl)dimethyl betaine, sodium β-laurylaminopropionate, sodium lauryldiaminoethylglycine, decyldimethylamine oxide, and lauryldimethylamine oxide, and wherein concentration of the alcohol is 10 to 90 wt %.

11. An anti-fogging method, comprising:
applying an anti-fogging agent to a surface prone to fogging and preventing fogging of the surface,
the anti-fogging agent comprising:
(A) a fluorinated amphoteric surfactant;
(B) a fluorinated anionic or cationic surfactant; and
(C) a non-fluorinated amphoteric surfactant, and (D) an alcohol,
wherein the fluorinated amphoteric surfactant (A) is represented by the following formula (1):

$$R^f\text{—}X\text{—}Y^a \qquad (1),$$

wherein $R^f$ represents a fluoroalkyl or fluoroalkenyl group,
X represents an alkylene or arylene group which may contain a sulfoamide, carbonyl, or oxa group, and
$Y^a$ represents a zwitterionic group selected from the group consisting of betaine, sulfobetaine, and amine oxide groups,
wherein the fluorinated anionic surfactant (B) is represented by the following formula (2):

$$R^f\text{—}X\text{—}Y^b \qquad (2),$$

wherein $R^f$ and X are as described in formula (1) and $Y^b$ represents an anionic group selected from the group consisting of carboxyl, sulfuric acid, sulfone, and phosphoric acid groups, wherein the fluorinated cationic surfactant (B) is represented by the following formula (3):

$$R^f\text{—}X\text{—}Y^c \qquad (3),$$

wherein $R^f$ and X are as described in formula (1) and $Y^c$ represents an ammonium group, and wherein the non-fluorinated amphoteric surfactant (C) is selected from the group consisting of cocamidopropyl betaine, lauryl betaine, lauramidopropyl betaine, alkyldimethylaminoacetic acid betaine, 2-alkyl-N-carboxymethyl-N-hydroxyethyl imidazolinium betaine, lauryl hydroxysultaine, lauryl(2-hydroxy-3-sulfopropyl)dimethyl betaine, sodium β-laurylaminopropionate, sodium lauryldiaminoethylglycine, decyldimethylamine oxide, and lauryldimethylamine oxide; wherein the concentration of the alcohol is from 10 to 90 wt %.

12. An anti-fogging method, comprising:
applying an anti-fogging agent to a surface prone to fogging and preventing fogging of the surface,
the anti-fogging agent comprising:
(A) a fluorinated amphoteric surfactant;
(B) a fluorinated anionic or cationic surfactant;
(C) a non-fluorinated amphoteric surfactant; and
an alcohol, wherein the fluorinated amphoteric surfactant (A) is represented by the following formula (1):

$$R^f\text{—}X\text{—}Y^a \quad (1),$$

wherein $R^f$ represents a fluoroalkyl or fluoroalkenyl group,

X represents an alkylene or arylene group which may contain a sulfoamide, carbonyl, or oxa group, and $Y^a$ represents a zwitterionic group selected from the group consisting of betaine, sulfobetaine, and amine oxide groups, wherein the fluorinated anionic surfactant (B) is represented by the following formula (2):

$$R^f\text{—}X\text{—}Y^b \quad (2),$$

wherein $R^f$ and X are as described in formula (1) and $Y^b$ represents an anionic group selected from the group consisting of carboxyl, sulfuric acid, sulfone, and phosphoric acid groups, wherein the fluorinated cationic surfactant (B) is represented by the following formula (3):

$$R^f\text{—}X\text{—}Y^c \quad (3),$$

wherein $R^f$ and X are as described in formula (1) and $Y^c$ represents an ammonium group, wherein the non-fluorinated amphoteric surfactant (C) is selected from the group consisting of cocamidopropyl betaine, lauryl betaine, lauramidopropyl betaine, alkyldimethylaminoacetic acid betaine, 2-alkyl-N-carboxymethyl-N-hydroxyethyl imidazolinium betaine, lauryl hydroxysultaine, lauryl(2-hydroxy-3-sulfopropyl)dimethyl betaine, sodium β-laurylaminopropionate, sodium lauryldiaminoethylglycine, decyldimethylamine oxide, and lauryldimethylamine oxide, wherein the combined concentration of the fluorinated amphoteric (A) and the fluorinated anionic or cationic surfactant (B) is 0.1 to 60 wt%, and wherein concentration of the alcohol is 10 to 90 wt %.

* * * * *